United States Patent [19]
Meggitt

[11] Patent Number: 6,029,874
[45] Date of Patent: Feb. 29, 2000

[54] ARTICLE CARRYING DEVICE FOR ATTACHMENT TO A BICYCLE FOR CARRYING BASEBALL BATS, GLOVES AND OTHER SPORTS EQUIPMENT OR OBJECTS

[76] Inventor: Austin Steven Meggitt, 455 McIntosh La., Amherst, Ohio 44001

[21] Appl. No.: 09/175,557

[22] Filed: Oct. 20, 1998

[51] Int. Cl.$^7$ .................................................. B62J 11/00
[52] U.S. Cl. ........................ 224/412; 224/419; 224/420; 224/919
[58] Field of Search ..................... 224/457, 412, 224/413, 419, 420, 425, 919, 912; 116/166; 359/842

[56] References Cited

U.S. PATENT DOCUMENTS

| | | | |
|---|---|---|---|
| 965,436 | 7/1910 | Brott | 224/457 |
| 3,837,545 | 9/1974 | Rogers, Jr. | 224/446 |
| 4,250,770 | 2/1981 | Robertson, Jr. | 74/551.1 |
| 4,730,756 | 3/1988 | Flavell et al. | . |
| 4,828,151 | 5/1989 | Goss | 224/438 |
| 4,856,744 | 8/1989 | Frankel | 48/227.4 |
| 5,353,973 | 10/1994 | McMurtrey | . |
| 5,435,471 | 7/1995 | Chuang | . |
| 5,487,497 | 1/1996 | Kwiatkowski | 224/420 |
| 5,673,833 | 10/1997 | Ortlieb | . |
| 5,829,656 | 11/1998 | Reitz et al. | 224/417 |

*Primary Examiner*—Gregory M. Vidovich
*Assistant Examiner*—Maerena Brevard
*Attorney, Agent, or Firm*—Arter & Hadden LLP

[57] ABSTRACT

An article carrying device for attachment to handlebars of a bicycle has a generally elongate main center section supported by attachment legs which attach to opposite ends of handlebars to position the main center section generally parallel to and spaced from the major lineal extent of the handlebars. Fastening devices such as clips and hooks are attached to the main center section and adapted to support one or more articles of differing geometry such as a baseball bat and glove, with a baseball bat removably engageable in spring-biased clips generally vertically oriented relative to the main center section, and a baseball glove supported upon a hook or clip depending from the main center section between the clips. The main center section and attachment legs can be made length adjustable to fit handlebars of different sizes and configurations.

18 Claims, 2 Drawing Sheets

ARTICLE CARRYING DEVICE FOR ATTACHMENT TO A BICYCLE FOR CARRYING BASEBALL BATS, GLOVES AND OTHER SPORTS EQUIPMENT OR OBJECTS

FIELD OF THE INVENTION

The present invention pertains generally to bicycle accessories of the type which attach to a bicycle and, more particularly, to bicycle accessories which hold various objects for transport by the bicycle.

BACKGROUND OF THE INVENTION

Many different types of carrying accessories have been devised for bicycles. These include baskets which attach to the frame, over the rear wheel, or to the handlebars, and air pump and water bottle clips commonly attached to the frame between the seat post and handlebars. Bicycle baskets are suitable for carrying relatively uniformly shaped objects such as boxes or bags, while clip-type devices are generally used for relatively small objects. Clips also tend to be very device specific, and therefore not able to accommodate two or more objects of dissimilar geometry. There are many different ways of attaching baskets to bicycle handlebars, such as described in U.S. Pat. Nos. 3,695,496; 4,269,336; 5,353,973 and 5,775,559. However, little has been done in the utilization of adjustable structures and article-engaging clips attachable to bicycle handlebars.

The prior art has not provided an adequate bicycle accessory for objects as unwieldy as a baseball bat, nor has there been provided a clip which carries two or more objects of very different shape such as a baseball bat, baseball glove and a ball in combination.

SUMMARY OF THE INVENTION

The present invention performs functions unfulfilled by the prior art, and enables easy transport of awkwardly shaped objects by bicycle. In accordance with one aspect of the invention, there is provided an article carrying device adapted for attachment to a bicycle and in particular to handlebars of a bicycle, the article carrying device having a generally elongate main center section positionable generally parallel to a length dimension of a bicycle handlebar, attachment legs extending generally perpendicularly from opposite ends of the main center section, distal ends of the attachment legs adapted for attachment to a bicycle handlebar whereby the main center section is positioned a distance from the handlebar, and article engagement devices attached to the main center section operative to engage one or more articles proximate to the main center section for transport by the bicycle. Additional article-engaging clips, hooks or enclosures may extend from the main center section of the article carrying device.

In accordance with another aspect of the invention, an article carrying device adapted for attachment to handlebars of bicycle includes a generally elongate main center section having a length sufficient to substantially extend from one end of bicycle handlebars to an opposite end, attachment legs extending generally perpendicularly from opposite ends of the main center section, attachment devices at distal ends of the attachment legs adapted for attachment to bicycle handlebars between laterally opposed grips of the bicycle handlebars, and at least one article engagement device attached to the main center section adapted to engage an article such as sports equipment to be carried by the device.

These and other objects of the present invention are herein described in particularized detail with reference to the accompanying Figures.

DETAILED DESCRIPTION OF PREFERRED AND ALTERNATE EMBODIMENTS

Figure 1:
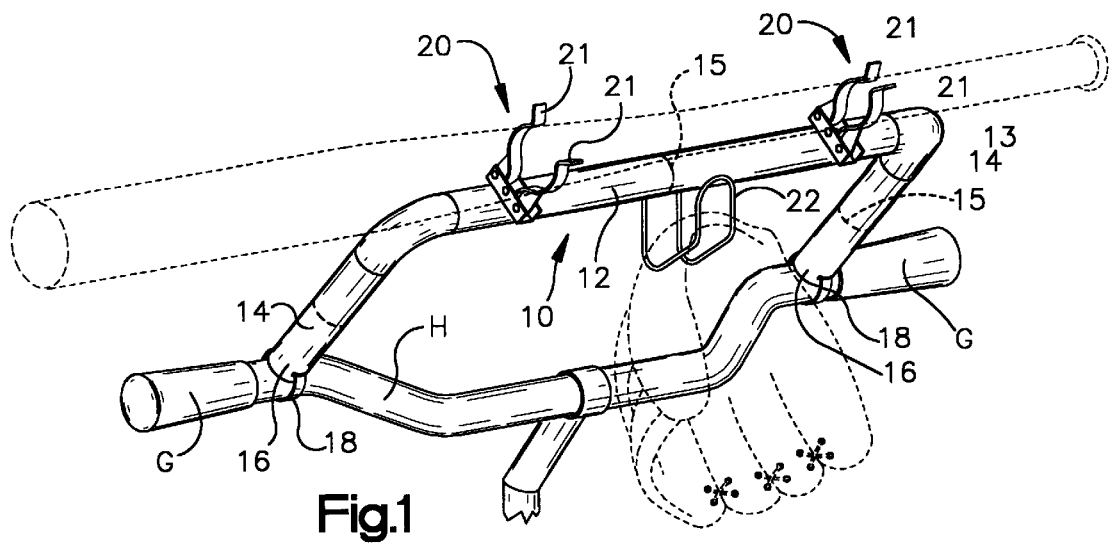
FIG. 1 is a perspective view of the article carrying device of the invention as installed upon the handlebars of a bicycle.
Figure 3:
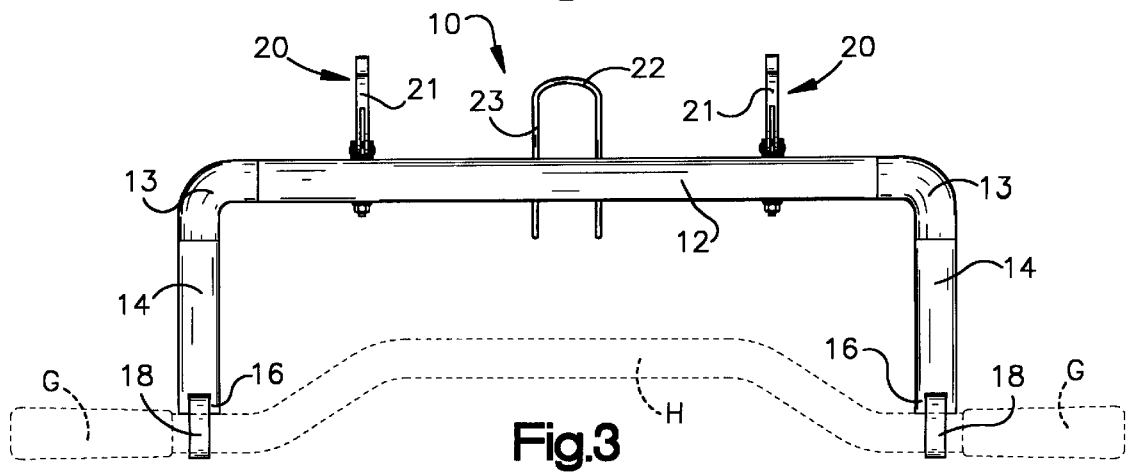
FIG. 3 is a top view of the article carrying device of the invention taken in the direction of the arrows 3—3 in FIG. 2.

With reference to the Figures, there is shown an article carrying device, indicated generally at 10, which is adapted for attachment to a bicycle B, and particularly adapted for attachment to the bicycle handlebars H. As shown in FIGS. 1 and 3, the device 10 includes a main center section 12 which is generally elongate and linear, having a length approximately equal to a major length of handlebars H, but does not generally extend beyond the handlebar grips G, although in certain alternate embodiments could. Although shown in substantially linear form, it is within the invention to have some curvature or bends in the main center section 12, to better fit other types of handlebars or articles to be carried. Also, the linear extent of the main center section 12 can be varied to be substantially less than or greater than the overall length of the handlebars dependent again on the structure of the bicycle and the types of articles to be carried.

Figure 2:
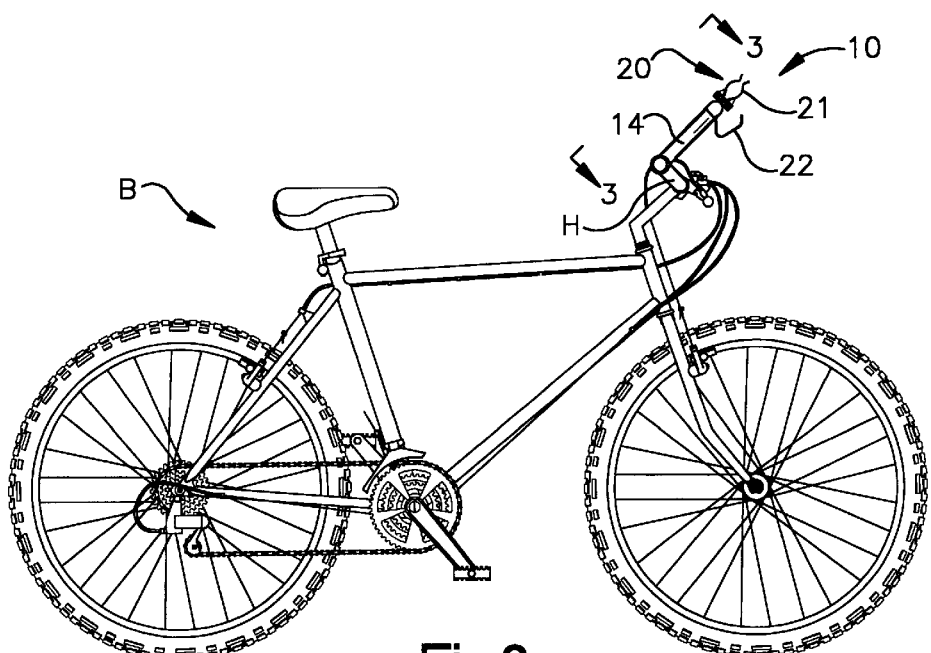
FIG. 2 is an elevation of a bicycle and the article carrying device of the invention attached to the handlebars of the bicycle.

Extending generally perpendicularly from opposite ends of the main center section are attachment legs 14, connected to the main center section 12 through elbows 13. Distal ends 16 of the attachment legs 14 are fitted with attachment devices 18, such as worm clamps, hose clamps, straps, welds, rivets, magnets, adhesive, or any other suitable fastener for securement of the attachment legs to the handlebars as shown. As best shown in FIG. 2, the angle of incidence of the attachment legs 14 relative to the handlebars can be selectively set by adjustment of attachment devices 18. The angle is preferably set so that the main center section 12 is positioned forward of the handlebars H and slightly down so that the view of the rider is not obstructed by either the article carrying device 10 or articles engaged therein.

Attached to the main center section 12 are one or more article engagement devices 20 (also referred to herein as clips, securement means and attachment or engagement mechanisms) which may be, for example, spring clips, buckle fasteners, magnetic devices, engageable fabric such as Velcro®, or any other suitable securement device operative to secure one or more objects or articles directly or indirectly to the main center section 12. In the example shown in FIG. 1, the article engagement devices are spring clips which have spring-biased or spring steel opposed arms 21 with an opening generally vertically oriented to receive and securely hold the shaft and handle of a baseball bat as shown in phantom. Alternatively, one of the clips 20 could be dimensioned larger to accept the large barrel section of the bat. As further explained, the clips or article engagement devices may be engaged with other types of sports equipment or objects.

As further shown, an article suspension device such as hook 22 may also be attached to the main center section 12, preferably in a depending manner as shown so that an article such as a baseball glove (shown in phantom in FIG. 1) can hang from the hook 22 forward and clear of handlebars H. Of course, other types of articles could be similarly suspended from hook 22, which may also include spring-biased clips or hooks. Multiple clips and hooks may be attached to the main center section for engagement with different types and quantities of articles. Furthermore, as best shown in FIG. 3, the hook 22 or other article suspension device may have a generally U-shaped frame 23 which can be used to capture an object such as a ball between the clip frame 23 and the main center section 12. The configuration of the clip frame 23 can be set to accommodate articles of different shapes, for example, to be made generally circular to tightly compress a ball against the main center section 12 and against a descending portion of the clip frame 23.

The main center section 12 and attachment legs 14 can be made of any suitable material such as steel or plastic/PVC tubing, with elbows 13 at the intersection of the main center section with the attachment legs 14. Also, both the main center section 12 and the attachment legs 14 can be constructed with inner and outer telescoping sections, shown at joints 15, to enable the device to be readily adjusted to fit handlebars of different sizes.

Figure 4:
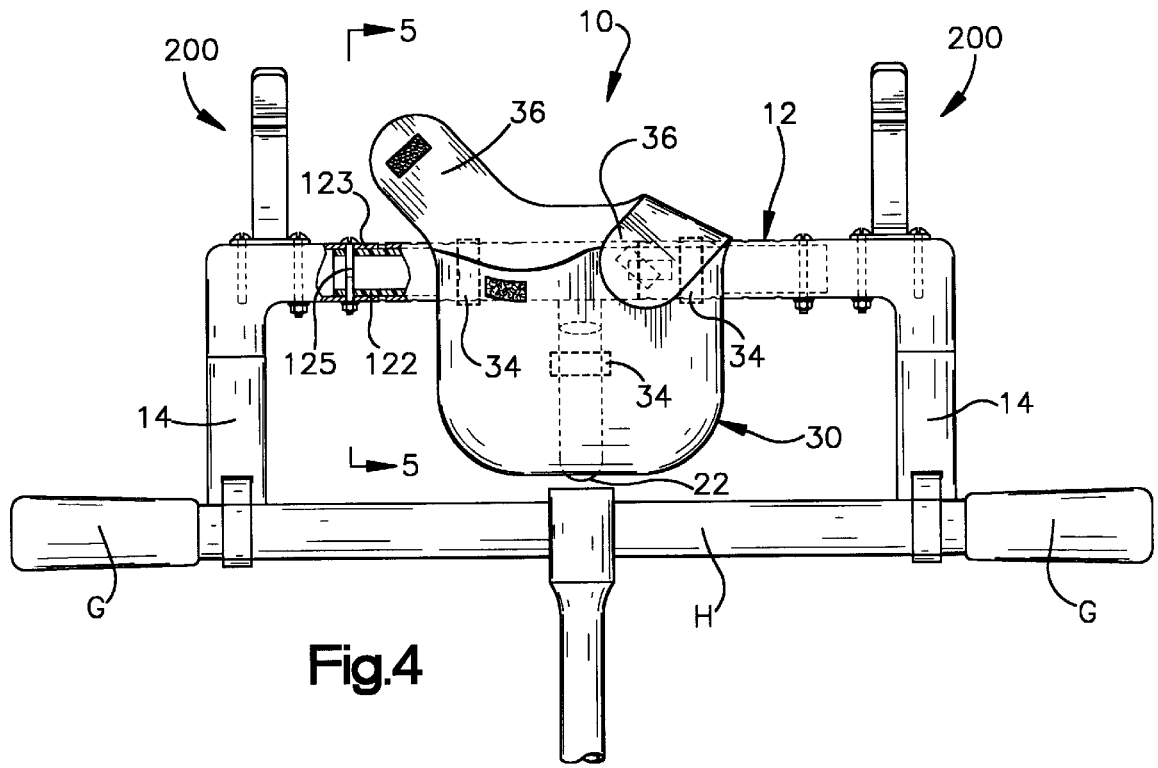
FIG. 4 is a top view of an alternate embodiment of the article carrying device of the invention.

For example, FIG. 4 illustrates an alternate embodiment of the invention wherein the main center section 12 is made length-adjustable by an internal member 122 telescopically fit within an external member 123 and fixed to a selected length by intersecting pins or screws or bolts 125 positioned in aligned throughholes in members 122 and 123. This enables linear lengthwise adjustment of the main center section 14 to accommodate attachment of the article carrying device to bicycle handlebars of different sizes, and to accommodate engagement with articles of different lengths.

Figure 5:
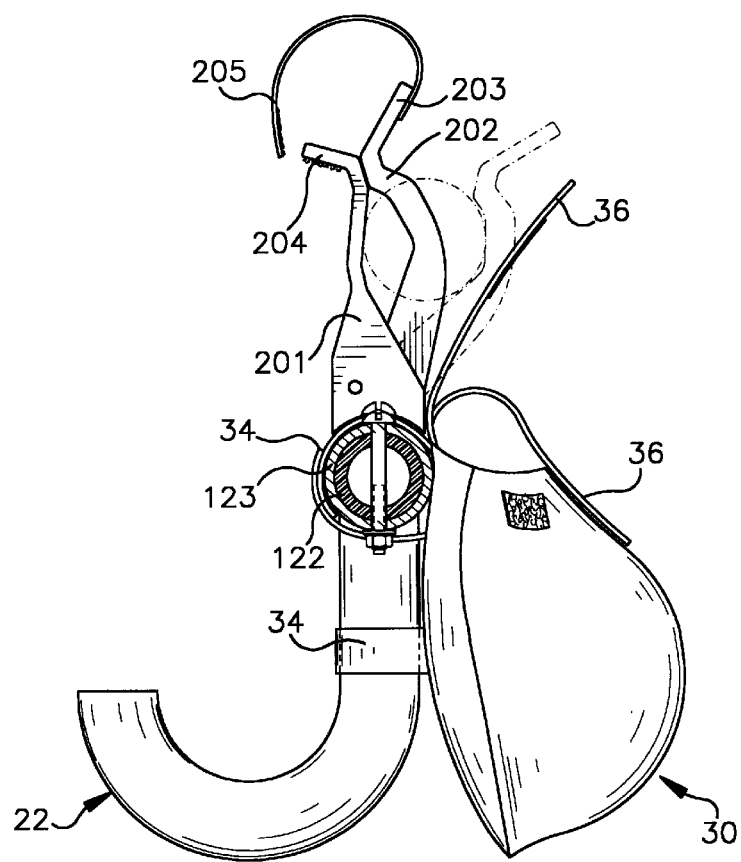
FIG. 5 is a partial side elevation of the article carrying device of the invention, taken in the direction of the arrows 5—5 in FIG. 4.

FIGS. 4 and 5 further illustrate an alternate embodiment of article engagement devices or clips 20, in the form of spring-biased jaw clamps 200, each having a first jaw 201 which is fixed relative to a hinge-mounted second jaw 202 spring-biased against the first jaw 201. The jaw clamps 200 are opened by applying pressure to an upper portion 203 of second jaw 202 to allow for insertion of an article such as a bat, as shown in cross-section in phantom in FIG. 5. The first and second jaws are preferably plastic or rubber coated to increase the gripping force on a bat engaged in the clamps. A strap 205 with, for example, a Velcro® fastener, may be provided for example to extend from the upper portion 203 of second jaw 202, to an upper portion 204 of first jaw 201, to provide additional securement of a bat or other article engaged in the jaw clamp. Also shown in FIGS. 4 and 5, an alternate embodiment of hook 22 is a serpentine or curved style hook preferably constructed of any suitable plastic to reduce weight and enhance the safety and adaptability of this aspect of the carrying device.

Further shown in FIG. 4 is a ball pouch, indicated generally at 30, which includes a generally flexible enclosure 32 dimensioned to receive and hold at least one spherical object such as ball, and to serve as a different type of article engagement device attached to the main center section 12. Attachment straps 34 are secured to an exterior of the enclosure 32 at positions to attach to the main center section 12, and a centrally disposed strap to attach to the hook means 22. Closure flaps 36 are secureable over an opening to the enclosure 32 to retain objects in the enclosure. This provides an alternate or additional carrying structure or attachment mechanism which attaches to the main center section 12 and avoids interference with the various parts of the article carrying device 10 and the articles engaged with the clips or fasteners 20.

The invention thus provides an enabling structure for attachment to bicycle handlebars which securely carries articles of widely varying geometry such as a baseball bat and glove. Once the article carrying device 10 is securely mounted to bicycle handlebars, it is rapidly and easily employed by simply engaging an elongate object such as a bat with the article engagement devices 20, hanging a second object such as a baseball glove on hook 22, or engaging another object such as a ball within the clip frame 23 or within additional article suspension devices, or carrying another object or objects within enclosure 30 or other article engagement devices attached to the main center section 12.

Although described with specific reference to baseball equipment, it will be appreciated that the invention could be adapted to carry any type of object or objects engageable with the various mechanisms of the device, such as for example and without limitation golf clubs, tennis rackets, lacrosse equipment, hockey sticks, helmets which may be supported by the hook means, plus miscellaneous objects and even non-sport equipment objects.

Although the invention has been shown and described with reference to certain preferred and alternate embodiments, it is understood that certain variations and modifications which may occur to those of skill in the art are also within the scope of the invention as it is defined by the accompanying claims and equivalents thereto.

What I claim as my invention is:

1. A device for attaching one or more articles to a bicycle for transport by the bicycle, the device comprising:

a generally elongate main center section, attachment legs extending generally perpendicularly from opposite ends of the main center section, attachment devices secured to distal ends of the attachment legs and configured for attachment to handlebars of a bicycle, and at least one article engagement device attached to the main center section and adapted to engage a first article to be carried by the device proximate to the main center section, a hook attached to the main center section, the hook configured to engage a second article to be supported by the main center section, and wherein the attachment legs are comprised of two adjustable interfitting sections whereby a length of the attachment legs is adjustable.

2. The device of claim 1 wherein the main center section has a length approximately equal to a major linear extent of bicycle handlebars to which the device is attached.

3. The device of claim 1 wherein the article engagement device attached to the main center section is a spring clip.

4. The device of claim 1 wherein the article engagement device includes a first spring clip and a second spring clip spaced from the first spring clip, and wherein one of the spring clips is a size different than the other spring clip.

5. The device of claim 1 wherein the hook depends from the main center section.

6. The device of claim 1 wherein the hook comprises a frame configured to support a generally spherical object and to securely hold the object between the frame and the main center section.

7. The device of claim 1 wherein the main center section is comprised of two adjustable interfitting sections whereby a length of the main center section is adjustable.

8. The device of claim 1 wherein the attachment devices at the distal ends of the attachment legs are hose clamps.

9. An article carrying device adapted for attachment to handlebars of a bicycle, the device comprising:

a generally elongate main center section having a length sufficient to extend substantially from one end of bicycle handlebars to an opposite end, attachment legs extending generally perpendicularly from opposite ends of the main center section, attachment devices at distal ends of the attachment legs adapted for attachment to bicycle handlebars between laterally opposed grips of the bicycle handlebars, and at least one article engagement device attached to the main center section adapted to engage an article to be carried by the article carrying device, and wherein each of the attachment legs are comprised of two interfitting members whereby a length of either attachment leg is selectively adjustable.

10. The article carrying device of claim 9 in combination with a bicycle having handlebars to which the device is attached.

11. The article carrying device of claim 9 wherein the main center section is comprised of two interfitting members whereby a length of the main center section is selectively adjustable.

12. The article carrying device of claim 9 wherein the article engagement device is a clip having opposed spring-biased arms.

13. The article carrying device of claim 9 wherein a hook generally depends from the main center section whereby an article supported by the hook depends from the main center section.

14. The article carrying device of claim 9 wherein a hook is comprised of a frame having an open form whereby an article is supported by the frame and held against the main center section.

15. The article carrying device of claim 9 comprising a first separate article engagement device and a second separate article engagement device attached to the main center section, and wherein the first separate article engagement device is a different size than the second separate article engagement device.

16. The article carrying device of claim 9 wherein the article engagement devices attached to the main center section are jaw clamps having first and second spring-biased jaws.

17. A device for removably attaching a baseball bat and glove to the handlebars of a bicycle, the device comprising:

a generally elongate center section dimensioned to substantially span a length of bicycle handlebars to which the device is to be attached;

attachment legs extending generally perpendicularly from opposite ends of the main center section, and a fastener on a distal end of each of the attachment legs adapted to attach to the handlebars whereby the main center section is positioned generally parallel to and spaced from the bicycle handlebars;

bat-engaging clips on the main center section oriented to extend generally upward so that an opening in the bat-engaging clips is generally vertically oriented, and a glove-supporting hook attached to the main center section to depend from the main center section and located between the bat-engaging clips.

18. A baseball bat carrying device for attachment to handlebars of a bicycle and adapted for engagement of two different sections of a baseball bat whereby the baseball bat is transportable by the bicycle, the baseball bat carrying device comprising:

a generally elongate main center section having ends and being oriented to generally traverse the handlebars so that the ends are located proximate to grips of the handlebars, attachment legs extending from each end of the main center section, an attachment mechanism at an end of each attachment leg adapted for attachment to the handlebars, and one or more cooperative engagement devices on the main center section adapted to cooperatively and removably attach to differently dimensioned sections of a baseball bat to be carried by the device, and wherein the attachment legs are comprised of two adjustable interfitting sections whereby a length of the attachment legs is adjustable.

* * * * *